United States Patent [19]

Alexandres et al.

[11] Patent Number: 5,532,075
[45] Date of Patent: Jul. 2, 1996

[54] SMALL BATTERY CELL

[75] Inventors: Richard B. Alexandres, Clear Lake, Iowa; Elmer Hughett, Oneida, Tenn.

[73] Assignee: Alexander Manufacturing Corporation, Mason City, Iowa

[21] Appl. No.: 271,416

[22] Filed: Jul. 6, 1994

[51] Int. Cl.⁶ .......................... H01M 2/12; H01M 6/10
[52] U.S. Cl. ................... 429/54; 429/56; 429/72; 429/94
[58] Field of Search ................. 429/53–56, 94, 429/72, 168–172, 223, 194, 213

[56] References Cited

U.S. PATENT DOCUMENTS

| | | |
|---|---|---|
| 1,015,735 | 1/1912 | Heuser . |
| 1,636,328 | 7/1927 | Sauer . |
| 1,796,855 | 3/1931 | Ahlers . |
| 3,015,758 | 1/1962 | Hildebrandt et al. . |
| 3,956,677 | 5/1976 | Quick . |
| 4,091,181 | 5/1978 | Merritt, Jr. ................. 429/94 |
| 4,259,416 | 3/1981 | Ikeda et al. . |
| 4,476,202 | 10/1984 | Wesner ....................... 429/94 |
| 4,788,112 | 11/1988 | Kung . |
| 5,043,235 | 8/1991 | Seefeldt et al. . |
| 5,079,108 | 1/1992 | Annen et al. ............. 429/171 |
| 5,171,647 | 12/1992 | Dean et al. ................. 429/54 |

*Primary Examiner*—Anthony Skapars
*Attorney, Agent, or Firm*—Kenyon & Kenyon

[57] ABSTRACT

A small battery cell including a pressure relief and spring disengagement device which vents various internal pressures to the atmosphere to prevent cell bulging or explosion, and also which internally interrupts current flow through the cell due to internal cell overheat, excessive current flow or the like. Internal reconnection of cell members reoccurs subsequent to internal thermal or other abnormalities.

14 Claims, 4 Drawing Sheets

5,532,075

SMALL BATTERY CELL

BACKGROUND OF THE INVENTION

1. Field of the Invention

The present invention pertains to a battery cell, and more particularly, relates to a battery cell for use in electric devices. The battery cell includes internal safeguards such as automatic internal cell disengagement and re-engagement for cell pressure relief.

2. Description of the Prior Art

The prior art cell devices have included tabs from the electrodes leading to and welded to the positive and negative end plates. When a cell would experience dramatic operating conditions such as overheating, overcurrent, or other abnormal operating conditions, the internal connections would often be displaced to the point of subsequently rendering the battery inoperative during these abnormal excursions due to internal member breakage and the inability to accommodate internal movement of member components.

Clearly what is needed is a cell which is forgiving of the prior art design flaws and which can accommodate such internal movement and fluctuations without rendering the cell totally useless.

The present invention provides such a cell having pressure relief by frangible structure and automatic cell disabling and re-enabling capabilities.

SUMMARY OF THE INVENTION

The general purpose of the present invention is a small battery cell.

According to one embodiment of the present invention, there is provided a small battery cell assembly including a central electrode aligned within a case member and including members which align to the top and to the bottom regions of the central electrode, and within or adjoining the battery cell case. Aligned above the electrode assembly are a positive current collector, a spring, a positive contact member and a frangible cover. Aligned below the electrode assembly is a negative current collector. A case surrounds the electrode assembly, and other members form a negative contact member. The spring member in the upper portion of the cell exerts pressure downwardly upon the positive current collector to engage the positive electrode of the cell. Expansion of internal members of the cell overcomes spring tension to cause disengagement of the positive current collector with the positive electrode. Contraction of the internal members allows re-engagement by spring force. Pressure relief is provided for by a frangible cover located in the upper region of the cell.

One significant aspect and feature of the present invention is a battery cell having a frangible cover.

Another significant aspect and feature of the present invention is an internal current interrupter which disengages the positive electrode from a positive current collector during a pressure event and re-engages after the event.

An additional significant aspect and feature of the present invention is a spring member forcing engagement or re-engagement of the positive electrode to a positive current collector.

Still another significant aspect and feature of the present invention is a positive and a negative current collector having v-grooves for electrode contact.

Yet another significant aspect and feature of the present invention is a positive current collector which can move vertically within the battery case.

Having thus described embodiments of the present invention, it is the principal object of the present invention to provide a small battery cell having internal spring safeguards and a frangible cover safeguard.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
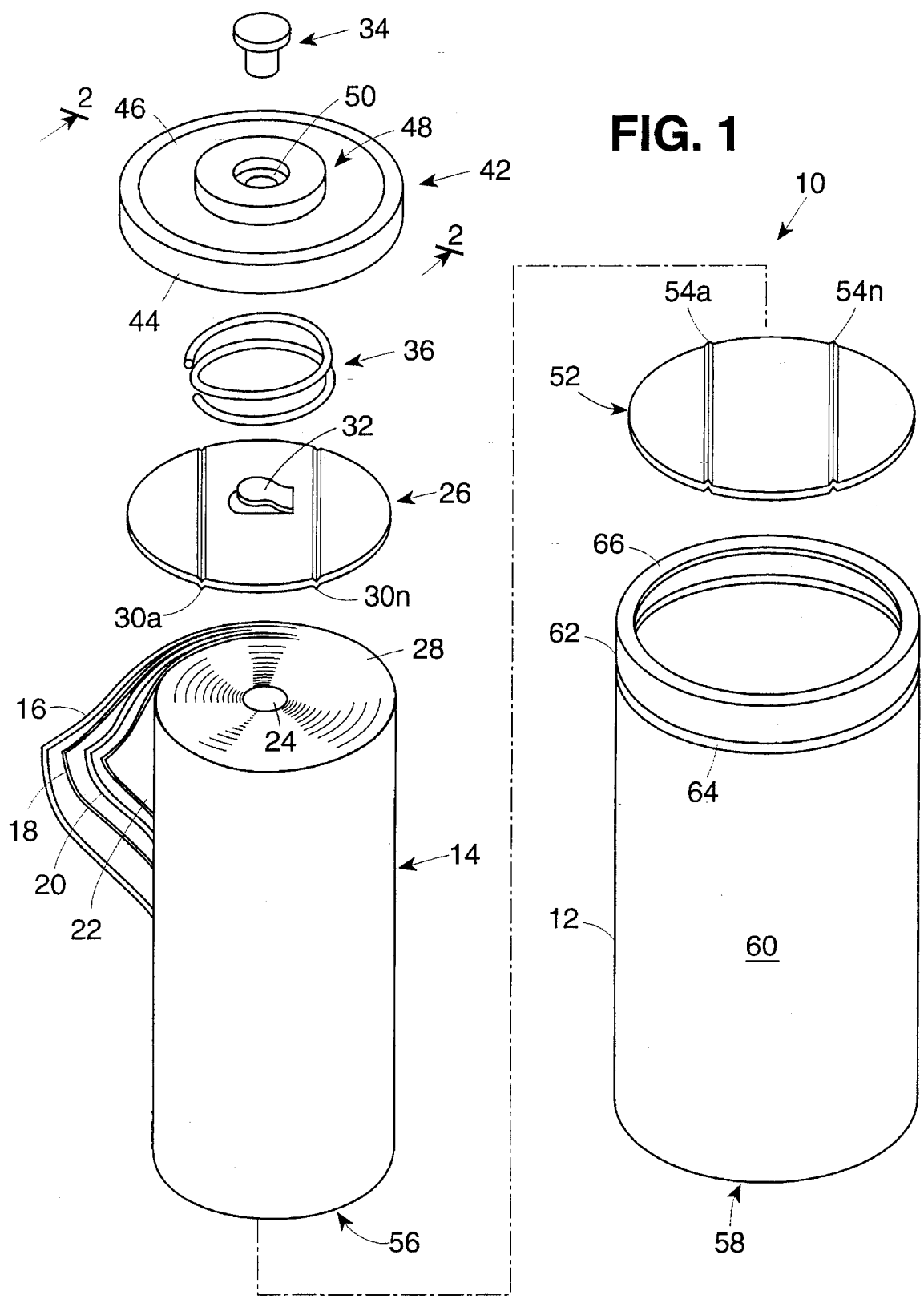
FIG. 1 is an exploded view of the small battery cell.
Figure 2:
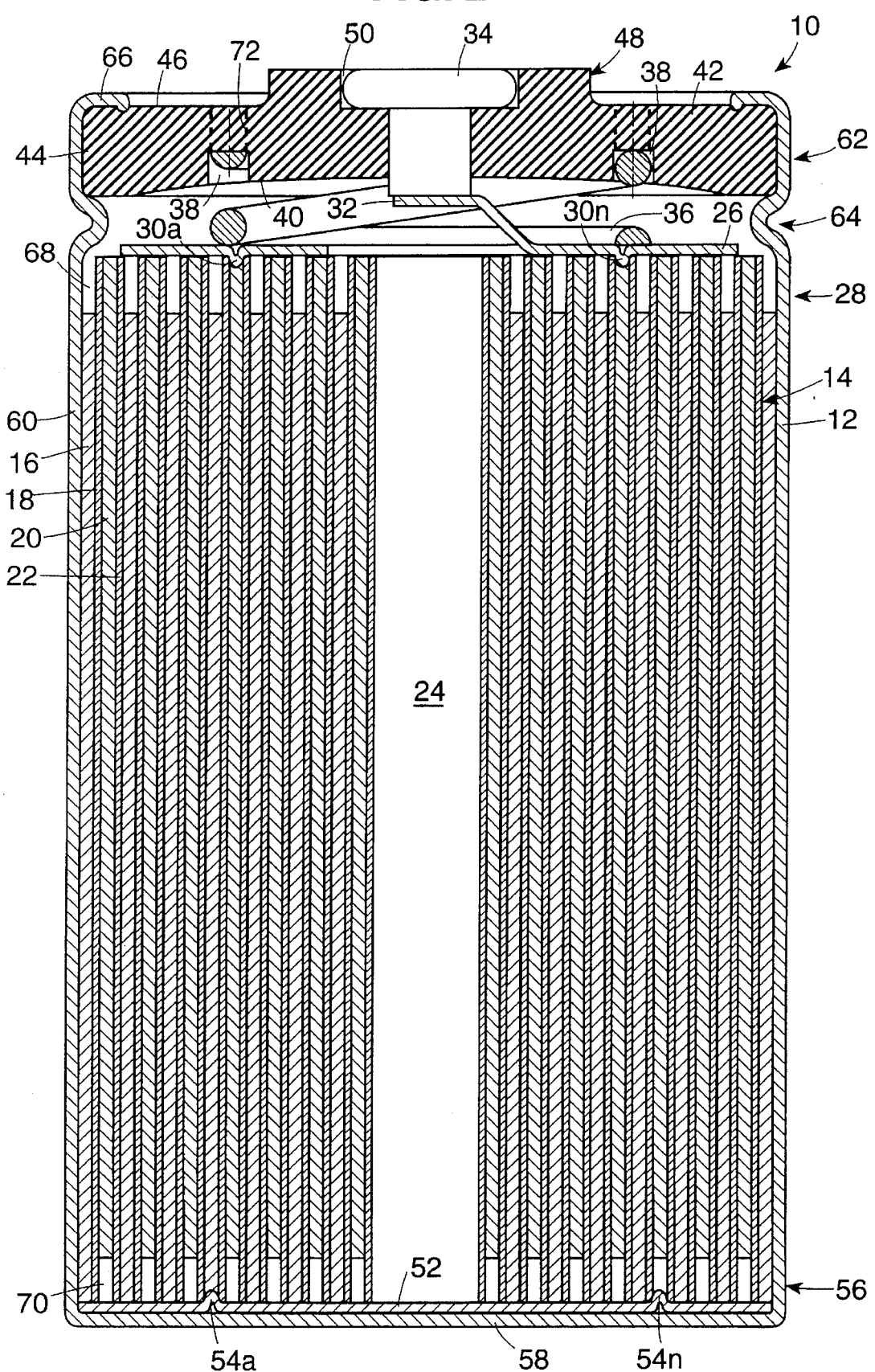
FIG. 2 is a cross-sectional view of the cell along line 2—2 of FIG. 1.

FIG. 1 illustrates an exploded view of a small battery cell 10 including a plurality of component members which align in a casing member 12. Aligned centrally in the casing member 12 is spirally wound electrode assembly 14 having a negative electrode 16, a first separator 18, a positive electrode 20 and a second separator 22 arranged as a layer and continuously layered over and about itself in spiral fashion in ever increasing radius about a mandrel hole 24. The electrodes are offset in height with respect to each other. A circular and substantially planar positive current collector 26 aligns in intimate contact to the upper surface 28 of the electrode assembly 14 to physically and electrically contact the positive electrode 20 at a plurality of contact areas, as illustrated in FIG. 2. A plurality of downwardly extending v-projections 30a–30n contact the wound positive electrode 20 along and about the top edge of the upper surface 28. A spring tab 32 extends upwardly at an angle and then extends horizontally parallel to the plane of the positive current collector 26. The spring tab 32 mates and secures to the bottom side of a positive contact 34 as illustrated in FIG. 2. A spring 36 aligns over and about the spring tab 32 to effect intimate physical contact with the upper surface of the positive current collector 26 at the lower portion of the spring 36. The upper portion of the spring 36 intimately contacts and aligns in and is captured in an annular groove 38 in a dome surface 40 of a frangible cover seal 42. A representative battery seal is U.S. Pat. No. 5,057,386. Spring 36 forces the positive current collector 26 into physical and electrical contact with the positive electrode 20 in the spirally wound electrode assembly 14.

With reference also to FIG. 2, the frangible cover 42 is generally disk shaped including an edge 44, an upper planar surface 46, an integral but frangible donut-like center section 48 extending vertically from the upper planar surface 46, a multi-radius cavity 50 extending through the frangible center section 48, a lower domed surface 40 and the annular groove 38 in the dome surface 40.

Other components secure into the lower portion of the case 12 to effect a negative contact portion of the battery including, a disk-like negative current collector 52 having a plurality of upwardly extending v-projections 54a–54n for contact with the wound negative electrode 16 along and about the bottom edge of the electrode assembly lower surface 56.

The integral one piece electrically conducting case 12 houses the previously described components and includes a bottom 58, a round side 60, and an upper containment portion 62 formed over and about the edge 44 of the frangible disk 42 including an annular groove 64 and an upper annular surface 66 crimped into sealing engagement with the upper planar surface 46 of the frangible cover 42.

The battery cell can be nickel, cadmium, nickel, metal hydride, lithium ion, lithium polymer, or silver metal hydride with the appropriate electrolyte such as potassium hydroxide. Representative uses for the cell can include a cellular telephone or a radio transceiver.

FIG. 2 illustrates a cross-sectional view of an assembled cell 10 along line 2—2 of FIG. 1 where all numerals correspond to those elements previously described. Illustrated in particular is the overall connection between the pluralities of positive and negative electrodes 20 and 16 to the associated positive and negative members of the cell 10. It is noted that the lengths of the positive and negative electrodes 20 and 16 are not of the same length as the interspersed first and second separators 18 and 22, and that a space 68 of ever changing spiral radius is provided over and above the top portion of the negative electrode 16. The positive electrode 20 extends upwardly beyond the height of the adjacent continued space 68, and between the upper regions of the first and second separators 18 and 22 where mutual physical and electrical contact with the v-projections 30a–30n of the positive current collector 26 is established. Contact of the v-projections 30a–30n of the positive current collector 26 with the negative electrode 16 is prevented in this region by the space 68 at the upper surface 28 of the electrode assembly 14. Spring tab 32 located on the positive current collector 26 extends upwardly and horizontally to align to and physically secure to and electrically connect to the underside of the positive contact member 34. The spring 36 aligns over and about the tab 32 and in the annular groove 38 on the underside of the dome surface 40 and the upper surface of the positive current collector 26 to exert downward pressure upon the positive current collector 26 to ensure contact of the v-projections 30a–30n with the positive electrode 20. Electrical current flow proceeds through the positive current collector 26, the spring tab 32, and the positive contact member 34.

Connection to the negative electrode 16 is accomplished in the lower region of the cell 10. A space 70 is provided over and below the bottom position of the positive electrode 20 much in the same position as for space 68 at the upper portion of the battery 10. The negative electrode 16 extends downwardly beyond the uppermost region of the adjacent continual space 70, and between the lower regions of the first and second separators 18 and 22 where mutual physical and electrical contact with the v-projections 54a–54n of the negative current collector 52 is established. Contact of the v-projections 54a–54n with the positive current electrode 20 is prevented in this region by the continual space 70 at the lower surface 56 of the electrode assembly 14. The negative current collector 52 is in intimate physical contact and electrical contact with the bottom 58 of the case 12 which is the negative contact member.

Frangibility of the frangible cover 42 is provided for by a thin annular frangible area 72 designated by heavy dashed black lines between the annular groove 38 and the upper planar surface 46. Should excessive internal pressures occur, the frangible cover 42 separates along the thin frangible annular area 72 to prevent excessive internal pressure build up thereby preventing all explosive or other such catastrophic events.

MODE OF OPERATION

Figure 3:
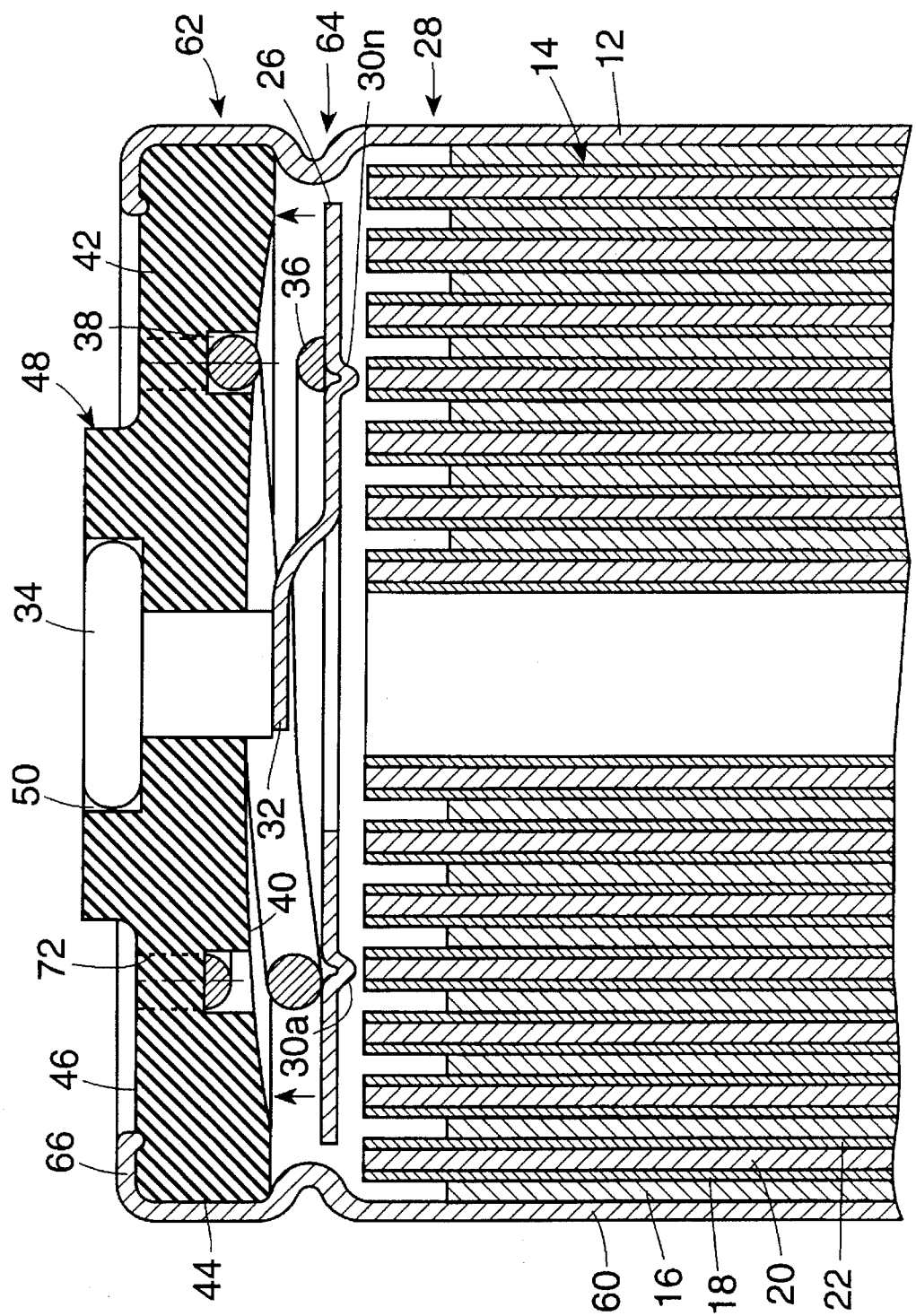
FIG. 3 is the top region of the cell of FIG. 1 showing the positive current collector disengaged from the positive electrode; and, FIG. 4 is a view of the top region of the cell of FIG. 1 showing the frangible cover has disengaged itself from the main body of the cell.

FIG. 3 illustrates the cell 10 of FIG. 2 where the positive current collector 26 has disengaged from the positive electrode 20 where all numerals correspond to those elements previously described. Internal gas pressures have caused the positive current collector 26 to move upwardly to physically and electrically disengage the positive electrode 20 from the positive current collector 26, thus interrupting current flow through the battery to act as a circuit breaker or interrupter. Subsequent to battery cool-down or other undesirable occurrences and after reduction of internal pressures, the spring 36 repositions the positive current collector 26 for re-engagement with the positive electrode 20 so that battery operation may once again continue operation.

Figure 4:
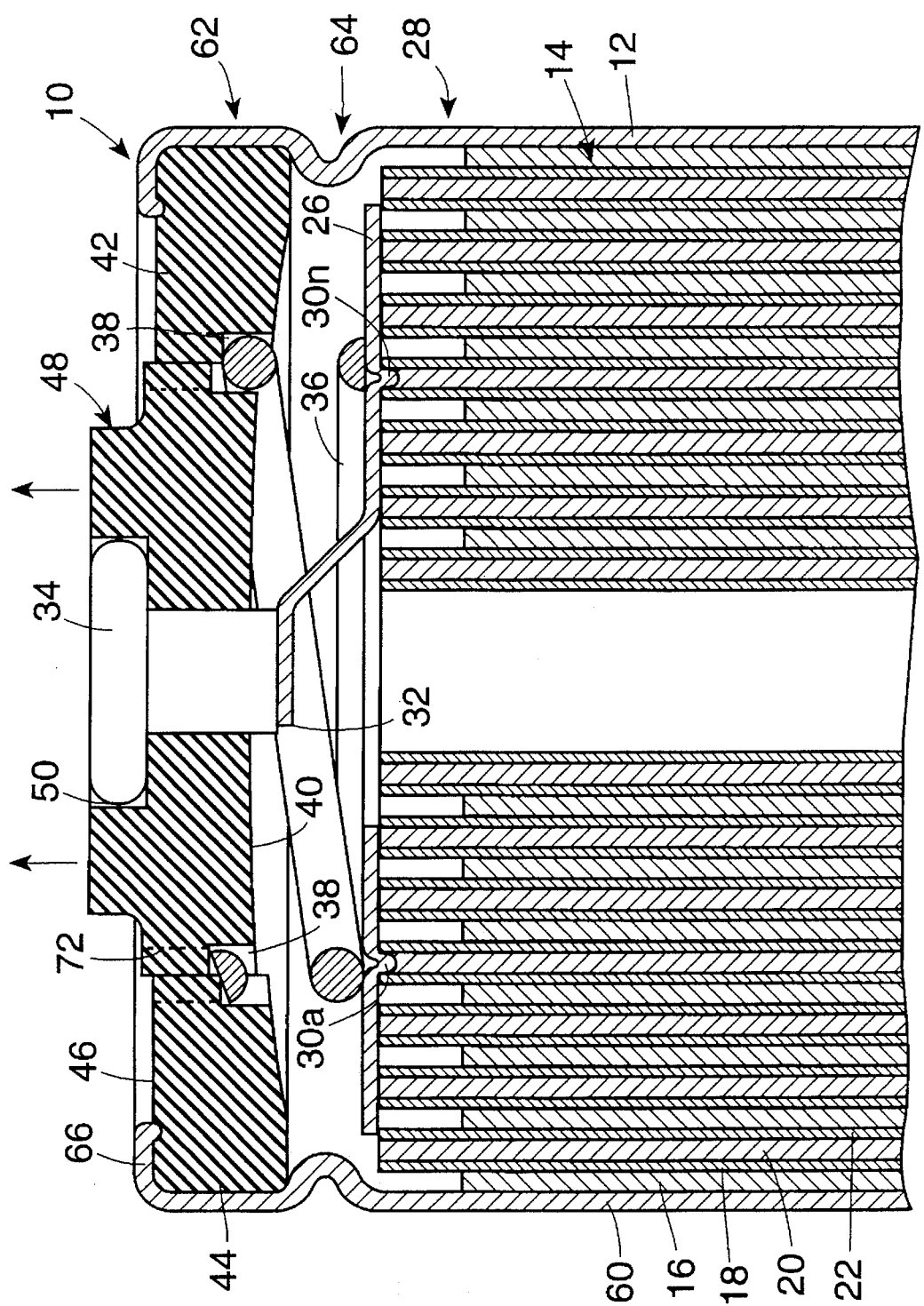

FIG. 4 illustrates the cell 10 of FIG. 2 where the center frangible section 48 has separated and where all numerals correspond to those elements previously described. High internal anomalies causing excessive pressures have caused the frangible thin area 72 to separate, thus allowing the frangible center section 48 to move generally in an upward direction allowing any built-up pressures to escape the case 12 interior. Though the frangible area 72 is illustrated as a wide band above the annular groove 38, breakage can occur anywhere in the frangible area 72, as illustrated. The breakage can occur in either a small or large arcual path about the frangible area 72 to let internal pressures bleed off. It is appreciated that these internal pressures can cause simultaneous movement of the positive current collector 26 as previously described and of the frangible center section 48 in concert to act as dual safety functions.

Various modifications can be made to the present invention without departing from the apparent scope hereof.

We claim:

1. A battery cell comprising:

a. a case;

b. an electrode assembly comprising a positive electrode and a negative electrode disposed within said case;

c. a positive current collector within said case in firm engagement with said positive electrode;

d. a negative current collector within said case in firm engagement with said negative electrode;

e. a cover at an end of said case, said cover being spaced from said positive current collector;

f. a positive contact member extending through said cover;

g. a flexible electrical conductor member connecting said positive current collector to said positive contact member; and, h. a spring positioned between said positive current collector and said cover and bearing against said cover and said positive current collector and urging said positive current collector into said firm engagement with said positive electrode, said positive current collector being held in said firm engagement with said positive electrode solely by the force exerted on said positive current collector by said spring, whereby upon occurrence of a force sufficient to overcome the tension of said spring, said positive current collector will move out of engagement with said positive electrode, and upon cessation of said force sufficient to overcome the tension of said spring, said spring will again force said positive current collector into said firm engagement with said positive electrode.

2. The battery cell of claim 1, wherein said flexible electrical conductor member is a spring tab formed in one piece with said positive current collector and extending therefrom into contact with said positive contact member.

3. The battery cell of claim 2, wherein said spring surrounds said spring tab.

4. The battery cell of claim 1, wherein said positive current collector has V-projections contacting said positive electrode.

5. The battery cell of claim 4, wherein said negative current collector V-projections contacting said negative electrode.

6. The battery cell of claim 1, wherein said cover has a groove formed therein facing said positive current collector, and wherein a portion of said spring is seated in said groove.

7. The battery cell of claim 6, wherein said cover is frangible and will readily rupture in the area of said groove upon the occurrence of excessive internal pressure.

8. The battery cell of claim 7, wherein said spring is a coil spring and said groove is annular.

9. The battery cell of claim 1, wherein said positive electrode and said negative electrode are spaced from each other by insulating separators and are spirally wound together with said insulating separators about a centrally located mandrel hole.

10. The battery cell of claim 1, wherein said cell is nickel cadmium.

11. The battery cell of claim 1, wherein said cell is nickel metal hydride.

12. The battery cell of claim 1, wherein said cell is silver metal hydride.

13. The battery cell of claim 1, wherein said cell is lithium ion.

14. The battery cell of claim 1, wherein said cell is lithium polymer.

\* \* \* \* \*

UNITED STATES PATENT AND TRADEMARK OFFICE
CERTIFICATE OF CORRECTION

PATENT NO. : 5,532,075
DATED : July 2, 1996
INVENTOR(S) : Alexandres et al.

It is certified that error appears in the above-indentified patent and that said Letters Patent is hereby corrected as shown below:

Column 1, line 67,
    delete "v-grooves" and insert --v-projections--;

Column 2, line 22,
    after "is" insert --a view of--

Column 3, line 17,
    delete "nickel, cadmium" and insert --nickel cadmium--;

Column 3, line 17,
    delete "nickel, metal" and insert --nickel metal--;

Column 4, line 8,
    delete "build" insert --build- --;

Column 5, line 21,
    after "collector" insert --has--.

Signed and Sealed this

Twenty-first Day of January, 1997

Attest:

BRUCE LEHMAN

*Attesting Officer*      *Commissioner of Patents and Trademarks*